UNITED STATES PATENT OFFICE.

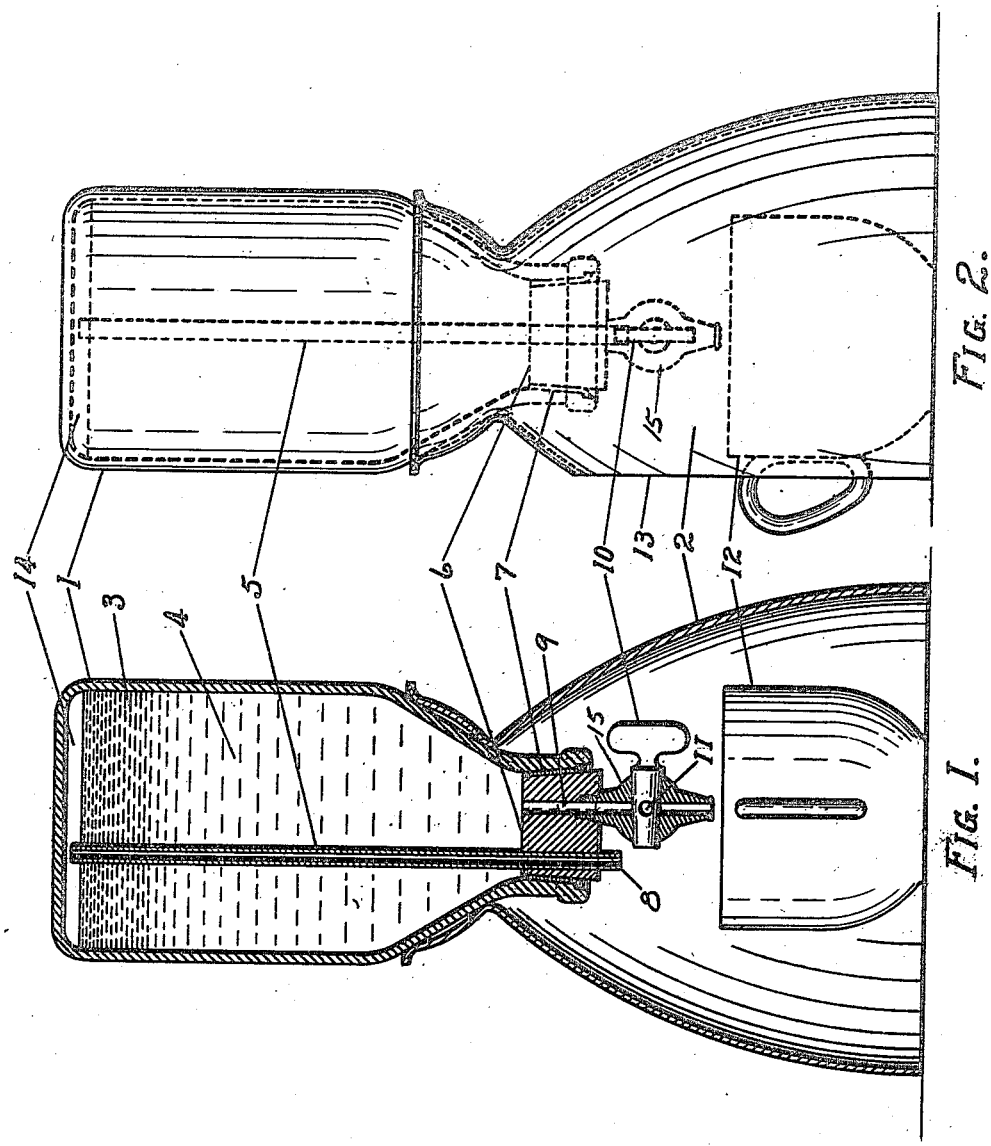

CLARENCE C. OLIPHANT, OF LOCKPORT, NEW YORK, ASSIGNOR TO WILLIAM H. EARL, OF LOCKPORT, NEW YORK.

DISCHARGER FOR BOTTLES.

1,075,268.  Specification of Letters Patent.  Patented Oct. 7, 1913.

Application filed April 6, 1910. Serial No. 553,886.

*To all whom it may concern:*

Be it known that I, CLARENCE C. OLIPHANT, a citizen of the United States, and a resident of the city of Lockport, in the county of Niagara and State of New York, have invented certain new and useful Improvements in Dischargers for Bottles, of which the following is a full, clear, and exact description.

This invention relates to means for drawing off liquids from a closed vessel and for supporting said vessel in a fixed position so the liquid may be undisturbed for any length of time previous to the drawing off.

The invention has for its objects a simple and inexpensive means for drawing off first the heavier portions of the liquid which is at the bottom of a vessel and then the lighter portions and so separating the liquid into as many portions as desired and also providing a means for supporting said vessel in a stationary position for a sufficient length of time to allow the heavier portions of the liquid to settle to the bottom and the lighter portions to rise to the top.

This invention is particularly adapted for use with milk bottles as in use at the present time and for supporting the bottle with milk in an inverted position until the cream rises to the top of the milk, when the milk can first be drawn off from the mouth of the bottle (which is now at the bottom) and then the cream can be drawn off. In this manner the cream is completely separated from the milk and not allowed to mix with the milk as happens when the cream has first been allowed to rise near the mouth of the bottle and the attempt is then made to pour off the cream.

The features of construction of this invention will be hereinafter described, and specifically pointed out in the claims, and in describing the invention in detail reference is had to the accompanying drawings, forming a part of this specification, and wherein like numerals of reference indicate like parts throughout the different views.

Referring to the drawings, Figure 1 is a central vertical view of my improved means for emptying bottles or similar receptacles. Fig. 2 is an outside side elevation of Fig. 1 showing inside portions dotted.

In the accompanying drawings 1 indicates a bottle, which may be of any suitable or desired shape and configuration but for the purposes of this description is preferably shown as similar to the milk bottles as at present in use.

6 is a stopper which may be made of any suitable material but is preferably of porcelain, glass or other like material which is sanitary and easily cleaned and is pressed into and held in the neck of the bottle 1.

7 is a gasket or lining of suitable material located inside the neck of the bottle and between it and the stopper for making an air tight seal and also for holding the stopper 6.

Extending through the stopper 6 and nearly to the bottom of the bottle 1 (which is here shown in an inverted position) is a tube 5 having a hole 8 its entire length. This tube 5 is preferably made adjustable in the stopper 6 so it can be slipped through the stopper 6 and its upper end so adjusted to the desired position near the bottom of the bottle or for use in different sized bottles.

9 is a passage through the stopper 6 and the stopcock 15.

10 is a plug or valve in the stopcock 15 and having a hole 11 through it which by turning can be brought into and out of communication with the passage 9.

2 is a support of any suitable material but preferably of metal for supporting the bottle 1 in an inverted and stationary position. The support 2 is shown as having a circular section open at the top and bottom and being cut off on one side at 13 to form an opening which will expose the stopcock 15 to allow of the valve 10 being reached and manipulated and also for inserting a suitable receptacle or cup 12 into which the contents of the bottle 1 can be emptied.

4 is the milk in bottle 1 and 3 is the cream which has risen to the top.

14 shows an air space above the top of the cream and into which the top of tube 5 projects.

In the use of my improved means for emptying bottles with an ordinary milk bottle the gasket 7 and stopper 6 are inserted in the neck of a bottle of milk, and the tube 5 adjusted near the bottom of the bottle and the valve 10 turned to close the passage 9. The bottle 1 is then inverted and placed in the support 2 and allowed to remain over night or until the cream 3 has risen. A cup 12 is then placed under the stopcock 15 and the valve 10 turned until the hole 11 is in line with the passage 9 when the milk at the bottom or in the neck of the bottle will flow into the cup 12 and air rises through the hole 8 of the tube 5 to take the place of the milk discharged. When the milk is drawn off to the cream the valve 10 is turned to stop the flow and another receptacle substituted to catch the cream which is then in like manner drawn from the bottle.

It will be noted that various changes may be made in the details of construction without departing from the spirit of my invention. By employing the term bottle I do not mean to be understood as limiting the invention to using the bottle, as it may be used in connection with jugs or other holding vessels having openings ordinarily closed by corks or stoppers, bungs or other closing devices.

Having thus fully described my invention what I claim is:

The combination in a liquid holding vessel of a discharger, consisting of a stopper separately holding a tube with an air inlet passage, and a stop-cock with a discharge passage, said tube being adapted to reach from the bottom of said vessel, and projecting through said stopper, said stopper being composed of porcelain or similar sanitary and noncompressible material and surrounded and held in said vessel by means of a compressible gasket.

In testimony whereof I affix my signature in the presence of two witnesses.

CLARENCE C. OLIPHANT.

Witnesses:
JOSEPH DONNELLY,
WILLIAM T. HUBER.